United States Patent
Peiffer et al.

(10) Patent No.: US 7,794,186 B2
(45) Date of Patent: Sep. 14, 2010

(54) GEAR CUTTING MACHINE, IN PARTICULAR BEVEL GEAR CUTTING MACHINE, HAVING A DEVICE FOR CHAMFERING / DEBURRING THE EDGES OF A WORK PIECE

(75) Inventors: Klaus Peiffer, Wallisellen (CH); Matthias Philippin, Rutesheim (DE)

(73) Assignee: The Gleason Works, Rochester, NY (US)

( * ) Notice: Subject to any disclaimer, the term of this patent is extended or adjusted under 35 U.S.C. 154(b) by 1073 days.

(21) Appl. No.: 11/481,462

(22) Filed: Jul. 6, 2006

(65) Prior Publication Data
US 2007/0020058 A1 Jan. 25, 2007

(30) Foreign Application Priority Data
Jul. 22, 2005 (DE) .................. 20 2005 011 790 U

(51) Int. Cl.
*B23F 19/10* (2006.01)
(52) U.S. Cl. ................. 409/8; 409/40; 409/55
(58) Field of Classification Search .............. 29/56.5, 29/893, 893.3, 893.35, 27 C, 27 R; 409/8–9, 409/160, 231, 201, 211, 185, 38, 40–41, 409/50, 55, 56–57
See application file for complete search history.

(56) References Cited

U.S. PATENT DOCUMENTS

| | | | | |
|---|---|---|---|---|
| 2,278,300 A | * | 3/1942 | Barter et al. | 409/8 |
| 2,451,447 A | * | 10/1948 | Ransome | 409/8 |
| 2,597,129 A | * | 5/1952 | Remich | 407/26 |
| 3,129,638 A | * | 4/1964 | Husby | 409/8 |
| 3,130,642 A | * | 4/1964 | Kulesh et al. | 409/8 |
| 3,188,915 A | * | 6/1965 | Hurth | 409/11 |
| 3,570,369 A | * | 3/1971 | Hoddinott et al. | 409/211 |
| 4,484,387 A | * | 11/1984 | Nachmany | 483/68 |
| 6,079,090 A | * | 6/2000 | Ongaro | 409/11 |
| 6,712,566 B2 | * | 3/2004 | Stadtfeld et al. | 409/26 |
| 7,103,973 B2 | * | 9/2006 | Wolff et al. | 29/893.35 |
| 7,310,863 B2 | * | 12/2007 | Lee et al. | 409/8 |
| 7,364,391 B1 | * | 4/2008 | Stadtfeld et al. | 409/2 |
| 2005/0260050 A1 | | 11/2005 | Ribbeck | |

FOREIGN PATENT DOCUMENTS

DE 1284256 11/1968

(Continued)

OTHER PUBLICATIONS

Machine Translation of JP-2003-300115, which patent document was published in Oct. 2003.*

(Continued)

*Primary Examiner*—Erica E Cadugan
(74) *Attorney, Agent, or Firm*—Robert L. McDowell

(57) ABSTRACT

A gear cutting machine wherein a chamfer/deburr device and tool are fastened to a fixed component of the gear cutting machine. In this way, it is possible to adjust the chamfering/deburring tool into the working position in a simple and dependable manner to remove the edges from a gear. The device preferably has a linear track as well as a pivot axis, which can position the tool into the optimum position for the chamfering and/or deburring of the gear.

10 Claims, 2 Drawing Sheets

FOREIGN PATENT DOCUMENTS

| | | | | |
|---|---|---|---|---|
| DE | 4111242 | A1 | * | 12/1991 |
| DE | 4122461 | C | * | 7/1992 |
| DE | 202004008263 | U1 | | 9/2004 |
| JP | 62-034720 | A | * | 2/1987 |
| JP | 01-164517 | A | * | 6/1989 |
| JP | 04-013517 | A | * | 1/1992 |
| JP | 10-76425 | | | 3/1998 |
| JP | 2000-141129 | A | * | 5/2000 |
| JP | 2003-300115 | A | * | 10/2003 |

OTHER PUBLICATIONS

Machine Translation of DE 4111242, which patent document was published in Dec. 1991.*

Patent Abstracts of Japan, Publication No. 10-076425, Publication Date Mar. 24, 1998, Mitsubishi Heavy Industries, "Gear Processing Device".

European Patent Office Search Report for EP 06014786.5, Nov. 2006.

* cited by examiner

GEAR CUTTING MACHINE, IN PARTICULAR BEVEL GEAR CUTTING MACHINE, HAVING A DEVICE FOR CHAMFERING / DEBURRING THE EDGES OF A WORK PIECE

This application claims the benefit of priority of German Utility Model Application No. DE 202005011790.0 filed Jul. 22, 2005.

FIELD OF THE INVENTION

The invention relates to a gear cutting machine, in particular bevel gear cutting machine, having a device to chamfer and/or deburr the edges between the flanks and the back face, in particular at the outer tooth ends, of a gear wheel produced in the gear cutting machine.

BACKGROUND OF THE INVENTION

With spiral-cut bevel gears, the flanks intersect with the back faces of the teeth at a specific angle. At the tooth, where the concave flank transitions into the back face, i.e., not observed on the gullet, the angle is an acute angle. At this point, an especially large burr is created during machining. The burr must be removed. In many cases, it is furthermore desired not only to remove the burr, but also to place a chamfer. With gears having this type of chamfer, the risk of injury during transport and installation is low at the otherwise sharp edge and furthermore, inadmissibly high hardness values are avoided at said places.

At times, a chamfering or deburring is also desired at the transition between the convex flanks and the back flank. Thus, this will require machining at both of the outer tooth ends of the bevel gear.

One of the devices known for the chamfering and/or deburring of the edges of bevel gears is disclosed in DE 20 200 40 08 263 U1 (corresponding to US 2005/0260050 to Ribbeck). With said device, the chamfering/deburring is performed on a machine for machining bevel gears. For this purpose, the machine is equipped with a chamfer/deburr cutter head. The cutter head is attached at the work piece spindle carrier. With the exception of the rotation of the work piece which is required for the chamfering/deburring, the cutter head has to perform all motions for the positioning relative to the work piece and the machining. This requires a high effort.

The object to be attained by the invention is to develop a gear cutting machine so that the chamfer/deburr process can be performed in a simple and dependable manner at the bevel gear.

SUMMARY OF THE INVENTION

In the gear cutting machine in accordance with the invention, the chamfer/deburr apparatus and tool are fastened to a fixed component of the gear cutting machine. In this way, it is possible to adjust the chamfering/deburring tool into the working position in a simple and dependable manner to remove the edges at the bevel gear. The device preferably has a linear track as well as a pivot axis, which can position the tool into the optimum position for the chamfering and/or deburring of the bevel gear.

DETAILED DESCRIPTION OF THE PREFERRED EMBODIMENTS

The invention is explained in greater detail by means of preferred embodiments which illustrate the invention by way of example only.

Figure 3:
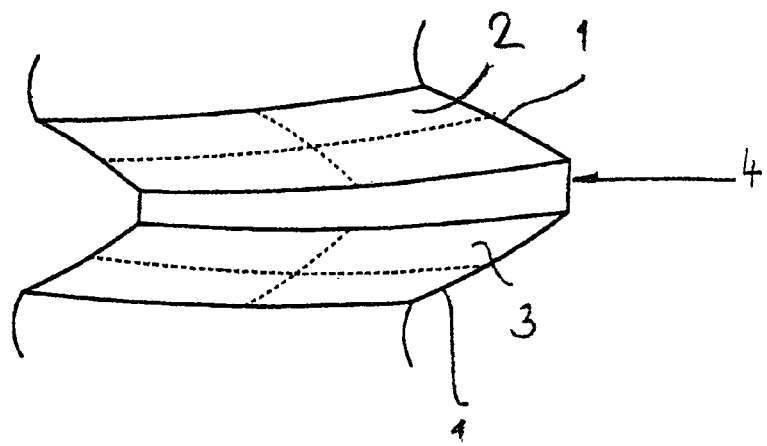
FIG. 3 illustrates a part of a gear wheel to be treated with the inventive device.

The device described in the following is used to chamfer and/or deburr the edges 1 between the flanks 2, 3 (FIG. 3) and a back face 4 (obscured in FIG. 3) of a bevel gear. It is also possible to use the device to machine the areas of the edges 1 where the transitions of the flanks 2, 3 are possibly rounded toward the top (preferably the face cone corner) and/or toward the root (top- and/or root rounding).

Figure 1:
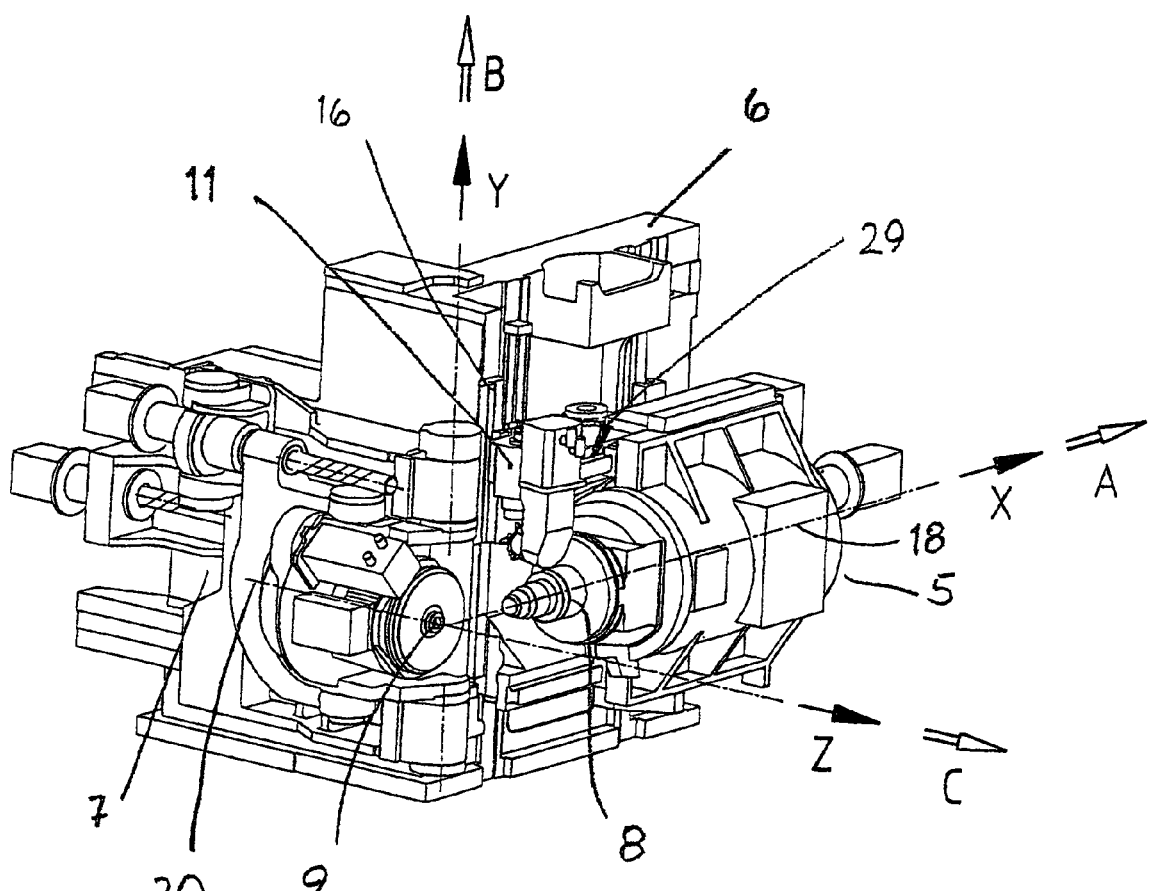
FIG. 1 illustrates a gear cutting machine with the inventive device, in perspective view.

FIG. 1 shows a machine, such as shown in U.S. Pat. No. 6,712,566 to Stadtfeld et al. for example, with the device used for the chamfering and/or deburring provided at the machine, preferably on the machine stationary column or stand 6. The machine is a bevel gear cutting machine and has a work piece carriage 5 that can be moved in direction X (direction of the work piece axis of rotation 18). Furthermore, the work piece carriage 5 can be adjusted along the stand 6 of the machine perpendicularly to the direction X into the direction Y (vertically). The machine furthermore has a tool carriage 7 which can be adjusted perpendicularly to the direction Y in direction Z. The work piece carriage 5 has a work piece spindle 8 that can rotate around the A axis. The tool carriage 7 can pivot around a B axis which is positioned parallel to the Y axis. The tool carriage 7 has a tool spindle 9 that can rotate around a C-axis. The C axis runs in direction Z.

The method of operation of a machine of this type is known and will therefore not be explained in detail. The machine described and shown in the illustrations has the device 29 for chamfering and/or deburring the bevel gear.

Figure 2:
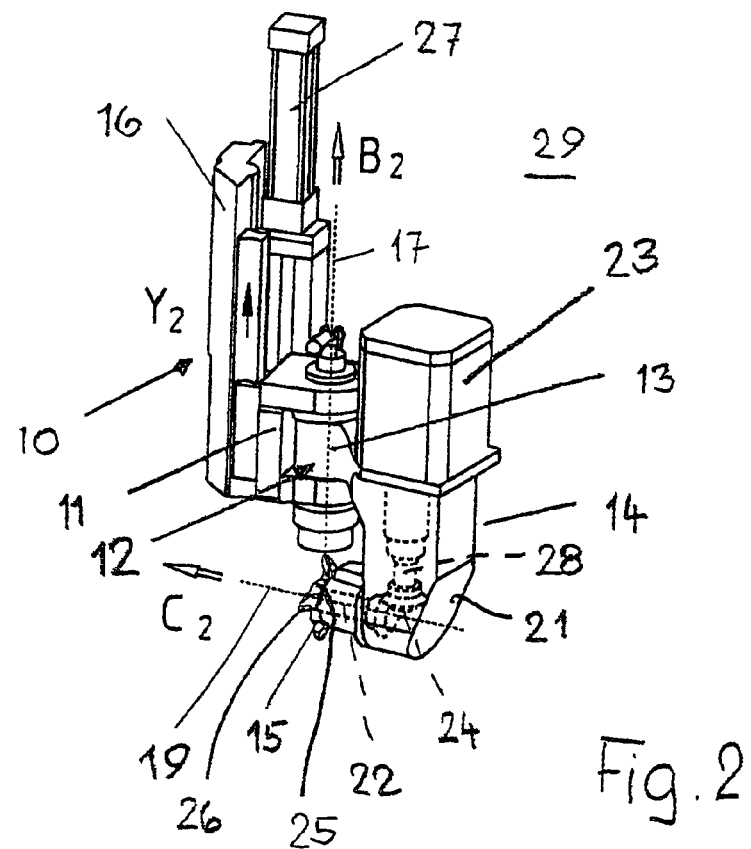
FIG. 2 shows the inventive device in perspective view.

The device 29 has a linear track 10 (FIG. 2) for a carriage 11. It is connected to a swivel joint 12 and the pivotable component 13 of said swivel joint is connected rigidly to a drive unit 14 for a tool 15. In the embodiment, this is a fly cutter which may be developed with single or multiple operations (e.g. cutting blades or inserts) for the machining in the continuous process. A disc-shaped tool may be used for machining in the single indexing method.

The linear track 10 of the device runs in direction Y. The pivot axis $B_2$ of the device is positioned parallel to the Y- and the $Y_2$ axis.

The fixed component 16 of the linear track 10 is attached to the stand 6 of the machine. The linear track 10 runs perpendicular to the work piece axis of rotation A and perpendicular to the tool axis of rotation C. The axis of rotation 17 of the swivel joint 12 is positioned parallel to the linear track 10 of the device and thus also parallel to the Y axis.

The tool 15 has a pivot axis 19 which is positioned perpendicular to the axis of rotation 17 of the swivel joint 12. With the swivel joint 12, the pivot axis 19 of the tool 15 can be moved in to a favorable position for chamfering and/or deburring.

The drive unit 14 has a housing 21, a tool spindle 22 for the tool 15, a motor 23 for driving the tool spindle 22 and a transmission 24 that connects the motor shaft 28 and the tool spindle 22. In the embodiment, the transmission 24 is a bevel gear system, in particular a bevel gear transmission. The bevel gear system 24 is provided, for example, for working space reasons. Principally, the transmission 24 is not required if there is sufficient space for the drive unit 14 at the machine.

The movement axis $Y_2$, which runs vertically, is provided for the tool 15. The axis $B_2$ is provided to pivot the tool 15. The tool 15 furthermore has the $C_2$ axis for rotating the tool. The axes $B_2$ and $C_2$ are advantageously NC axes.

The fly tool 15 has a structure 25 into which cutting tools such as cutting blades or, preferably, indexable inserts 26 (with one each indexable insert per tool operation) are inserted. Potential cutting material for the indexable inserts 26 includes coated finest grain hard metal (carbide), high-speed steel produced with powder metallurgy, and ceramics. The cutting edges of the indexable inserts 26 can be adapted to the form of the work pieces. Normally, however, the cutting edges of the indexable inserts 26 are straight at the edges. They have a radius at the outer diameter of the tool so as to be able to also machine transitions of the edges 1 of the work piece flanks 2, 3 to the root and/or the top of the work piece.

The required distance between the axes 18 and 19 for the chamfering and/or deburring depends, among other things, on the geometry of the tool and the work piece. Because the axes Y and $Y_2$ run parallel, the distance can be adjusted through the axis Y already available on the machine. Thus, the position of the tool on the $Y_2$ axis can be the same for all machining operations during the machining. Even the resting position can be the same for all applications. A NC axis is not required in this case.

In a simple embodiment, the $B_2$ axis is positioned manually and thus a NC axis is not required. However, the setup time can be shortened if $B_2$ is designed as a NC axis. Furthermore, the $B_2$ axis simplifies the machining of particularly complicated edges at the work piece.

In the simplest case, the positioning between work piece and chamfer and/or deburr tool 15 is effected through the axes X, Y, $B_2$ and A. The NC axes A and $C_2$ are synchronized for the operation in the continuous method corresponding to the ratio of number of teeth of the work piece and number of operations (e.g. number of "starts") of the tool. The feed occurs through an additional rotation $\Delta A$ of the work piece.

So as to better approximate the desired chamfer at the work piece to the ideal work piece edge, the axes X, Y and A and, if applicable, $B_2$ must be adapted accordingly.

The machining of the edges of the work piece proceeds as single-edge machining, usually in a continuous process. However, if the process is to run discontinuously, i.e., in the single indexing process, a disc-shaped tool must be used. In this case, the axes A and $C_2$ are not synchronized. The number of cutting discs of the tool can be determined independently of the number of teeth of the work piece.

When working in the continuous as well as in the discontinuous process, the process can proceed by teaching the machine to follow a predetermined guided tool path (i.e. Teach-in).

Instead of the Teach-in process, the coordinates of the track and the axes can be calculated for machining the edges of the work piece and the required settings and motions can be realized through the NC of the machine.

In the embodiment, the process of the tool 15 occurs between the operating- and resting position in $Y_2$ direction. Principally, a non-parallel position of $Y_2$ relative to Y or even a non-linear track can be realized with the appropriate drive for the traversing.

In the machine described above, the axes Y and X, which are available on the machine, are used for positioning the tool 15 relative to the work piece so that the device does not require any additional axes for this purpose.

While the invention has been described with reference to preferred embodiments it is to be understood that the invention is riot limited to the particulars thereof. The present invention is intended to include modifications which would be apparent to those skilled in the art to which the subject matter pertains without deviating from the spirit and scope of the appended claims.

What is claimed is:

1. Gear cutting machine for producing a gear, said gear cutting machine having a stationary stand, a work piece carriage, a tool carriage, a tool axis of rotation (C) and a pivot axis (B) about which said tool carriage is pivotally mounted, said gear having tooth flanks, a back face and edges defined between the tooth flanks and the back face, said gear cutting machine having a device to chamfer and/or deburr the edges, said device comprising a tool to chamfer and/or deburr the gear, said tool having a number of starts, wherein the chamfer and/or deburr device is attached to said stationary stand, said chamfer and/or deburr device comprising a linear track whereby said device is movable along said track in a vertical direction ($Y_2$), said device also comprising a tool axis of rotation ($C_2$) and a pivot axis ($B_2$), with said tool axis ($C_2$) of said device being separate from the tool axis (C) of said gear cutting machine and said pivot axis ($B_2$) of said device being separate from the pivot axis (B) of said gear cutting machine;

wherein the linear track extends perpendicular to a workpiece axis of rotation (A) and to the tool axis of rotation (C) of the machine and wherein the pivot axis ($B_2$) of the device is positioned parallel to a vertical axis (Y) along which the workpiece carriage is movably mounted along and relative to said stand for vertical workpiece movement on the machine.

2. The gear cutting machine of claim 1 wherein the tool has at least one insert comprising at least one cutting edge, with the form of said at least one cutting edge being different than the geometry of said edges of the gear.

3. The gear cutting machine of claim 2 wherein the tool is driven by a drive unit.

4. The gear cutting machine of claim 3 wherein the drive unit includes a motor, and a transmission that connects a motor shaft of said motor to a spindle for the tool.

5. The gear cutting machine of claim 4 wherein the transmission is a bevel gear transmission.

6. The gear cutting machine of claim 1 wherein the pivot axis ($B_2$) of the device is an NC-axis.

7. The gear cutting machine of claim 1 wherein the axis of rotation for the tool ($C_2$) of the device is an NC-axis.

8. The gear cutting machine of claim 7, wherein the rotary motions of the workpiece axis of rotation and the tool axis of rotation of the device (A, $C_2$) are synchronized corresponding to the ratio of the number of teeth in the gear and the number of starts of the tool.

9. The gear cutting machine of claim 1 further comprising a horizontal axis (X) for workpiece movement on the machine, wherein the pivot axis of the device, the workpiece axis of rotation, the horizontal axis for workpiece movement, and the vertical axis for workpiece movement ($B_2$, A, X, Y) are simultaneously controllable to effect a continuous path control of the tool.

10. The gear cutting machine of claim 1 wherein a drive is provided to traverse the tool along the linear track.

* * * * *